(12) United States Patent
Burdin et al.

(10) Patent No.: US 6,870,818 B1
(45) Date of Patent: *Mar. 22, 2005

(54) METHOD FOR IDENTIFYING DEVICES IN A COMMUNICATION NETWORK AND DEVICE FOR IMPLEMENTING SAID METHOD

(75) Inventors: Nicolas Burdin, Rennes (FR); Helmut Buerklin, Rennes (FR)

(73) Assignee: Thomson Licensing S.A., Boulogne-Billancourt (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/317,796

(22) Filed: May 24, 1999

(30) Foreign Application Priority Data

May 26, 1998 (FR) .............................. 98 06624

(51) Int. Cl.[7] .............................................. H04L 12/28
(52) U.S. Cl. ...................... 370/257; 370/453; 370/489
(58) Field of Search ................................ 709/220, 221, 709/222, 223, 253, 224, 227; 370/255, 256, 257, 453, 457, 252, 254, 408, 451, 475, 489

(56) References Cited

U.S. PATENT DOCUMENTS

| | | | | |
|---|---|---|---|---|
| 5,018,139 A | * | 5/1991 | Despres ...................... 370/408 |
| 5,394,556 A | | 2/1995 | Orprescu .................... 395/800 |
| 5,715,475 A | * | 2/1998 | Munson et al. ............... 710/10 |
| 5,724,517 A | * | 3/1998 | Cook et al. .................. 709/227 |
| 5,764,930 A | * | 6/1998 | Staats ......................... 710/107 |
| 5,781,772 A | * | 7/1998 | Wilkinson, III et al. .... 370/229 |
| 5,883,621 A | * | 3/1999 | Iwamura ...................... 725/37 |
| 6,038,625 A | * | 3/2000 | Ogino et al. ................ 710/104 |
| 6,052,750 A | * | 4/2000 | Lea ............................. 710/72 |
| 6,160,796 A | * | 12/2000 | Zou ........................... 370/257 |
| 6,233,615 B1 | * | 5/2001 | Van Loo ..................... 709/224 |
| 6,298,405 B1 | * | 10/2001 | Ito et al. ..................... 710/107 |
| 6,298,406 B1 | * | 10/2001 | Smyers ....................... 710/305 |
| 6,332,159 B1 | * | 12/2001 | Hatae et al. ................ 709/224 |
| 2001/0024423 A1 | * | 9/2001 | Duckwall et al. ........... 370/254 |

OTHER PUBLICATIONS

Paskins A: "The IEEE 1394 Bus", IEEE Half–Day Colloquium on New High Capacity Digital Media and Their Applications, May 12, 1997, pp. 4/1–4/06, XP002071700.

Hoffman G. et al.: "IEEE 1394: A Ubiquitous Bus", Digest Papers of the Computer Conference (Spring) Compcon, Technologies for the Information Superhighway, San Francisco, Mar. 5, 1995, pp. 334–338, XP000545446.

* cited by examiner

Primary Examiner—Chi Pham
Assistant Examiner—Anh-Vu H Ly
(74) Attorney, Agent, or Firm—Joseph S. Tripoli; Robert D. Shedd; Paul P. Kiel

(57) ABSTRACT

A process and a device for determining node address correspondence in a communication network in which each node is allocated a unique address after each network reset, wherein the addresses of a given node before and after a reset may differ. The process comprises the steps, at the level of a node connected to the network, of determining network topologies based on self-identification packets received before and after network reset, and of comparing these topologies for determining correspondence among addresses of a node before and after reset.

8 Claims, 5 Drawing Sheets

METHOD FOR IDENTIFYING DEVICES IN A COMMUNICATION NETWORK AND DEVICE FOR IMPLEMENTING SAID METHOD

BACKGROUND OF THE INVENTION

The present invention relates to the field of communication networks, especially of the home automation type and relates more particularly to a process for identifying apparatus of a home automation network after a bus reinitialization, as well as to an apparatus for implementing the process.

The IEEE 1394 bus defined in the document 'IEEE Std 1394-1995 High Performance Bus, 1996-08-30' describes a serial bus for digital transmission allowing the connection of apparatus also referred to as 'nodes'. Certain nodes comprise a fixed identification number which is unique to them and which is termed the 'EUI'. Furthermore, a second identifier or 'physical address' is associated with each apparatus during the bus initialization phases. This second identifier is referenced as the 'Physical_ID' in the abovementioned document and may change for one and the same apparatus at the whim of the bus reinitializations, following for example the connection of a new node or the disconnection of an existing node.

An example of reinitialization and of a process for allocating physical addresses is given in appendix E, sections 3.1 to 3.3 of the IEEE document.

Now, following a reinitialization, a node does not know the physical addresses of the other nodes connected to the bus, but only some of the identifiers EUI of these nodes. So that a node can find another node whose identifier EUI it knows, a reading of each identifier EUI must be performed at the level of each apparatus until the sought-after identifier is obtained, assuming that the node has not been disconnected.

This method of recognizing nodes is slow and generates traffic.

A purpose of the invention is to remedy the drawbacks of the method advocated in the prior art.

BRIEF SUMMARY OF THE INVENTION

The subject of the invention is a process for identifying nodes in a communication network, each node being provided with at least one port for connection to the network, characterized in that it comprises the steps of:

allocating a first unique address to each node of the network according to a given process, allocating a second unique address to each node of the network after a reinitialization of the said network, following a reinitialization, establishing a correspondence table comprising the relation between the first and the second address of a node.

According to a particular embodiment, the process furthermore comprises the step of determining the set of nodes which are present in the network before reinitialization and not present in the network after reinitialization, and/or the step of determining the set of nodes which are present in the network after reinitialization, but not present in the network before reinitialization.

According to a particular embodiment, the said step of establishing the correspondence table comprises for each port of each node the steps of determining:

the presence of a node connected to this port before and after reinitialization, and as appropriate, the writing of the pair of addresses before and after reinitialization into the said table, the presence of a node connected to this port before reinitialization and node absence after reinitialization, the presence of a node connected to this port after reinitialization and node absence before reinitialization.

According to a particular embodiment, the step of allocating the unique addresses comprises the step of sending over the network via each node of the network information giving its unique address in the network and for each of its ports the information item according to which a port is connected to a node termed the "father" node, to a node termed the "child" node or whether it is not connected.

According to a particular embodiment, the node intended to determine the correspondence table determines on the basis of the information received from the other nodes linked to the network during the step of allocating the unique addresses, the tree structure of the network before and after reinitialization.

The subject of the invention is also an apparatus intended to be linked to a communication network characterized in that it comprises:

means for participating in obtaining a unique address of a node of this apparatus in the network following a reinitialization;

means for determining and storing the topology of the network before and after a reinitialization of the network;

means for establishing a correspondence table between the unique addresses of the nodes of the network before and after the said reinitialization on the basis of the topologies of the network.

BRIEF DESCRIPTION OF THE DRAWINGS

Other characteristics and advantages of the present invention will emerge from the description of the illustrative embodiment which follows, taken by way of non-limiting example, with reference to the appended figures in which.

DETAILED DESCRIPTION OF THE INVENTION

To simplify the description, the same references will be used in the figures to denote the elements fulfilling identical functions.

According to the present illustrative embodiment, a node possesses one or more bidirectional ports via which it can be connected to other nodes. Not all the ports of a node are necessarily used in a given configuration. The connections are such that they do not form any loop, thus constituting a tree structure. A node is the child of another node, the latter being referred to as the father, if it is connected directly to the latter and if it is more distant than its father from the root, the latter being a node chosen by any process whatsoever.

It should be noted that a physical apparatus can comprise several distinct nodes.

Figure 1:
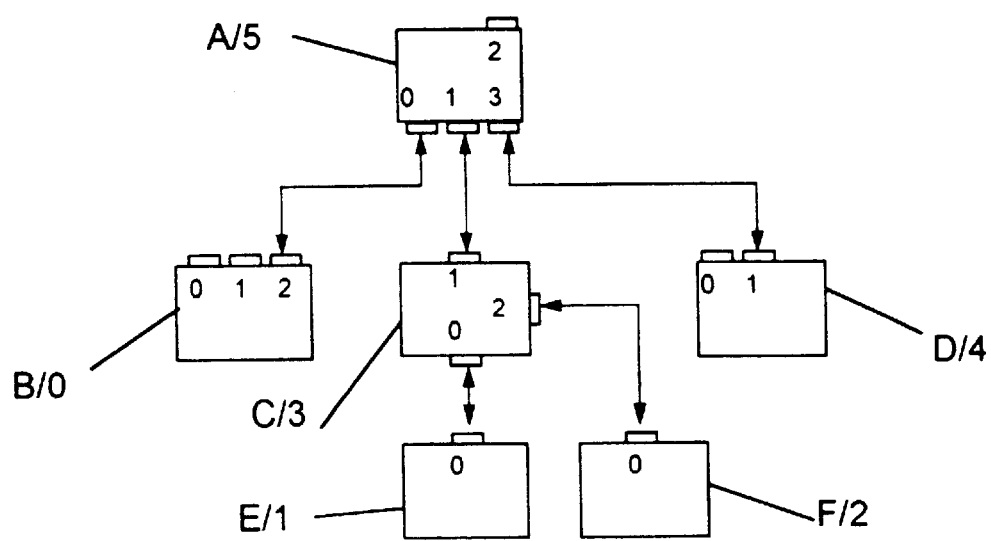
FIG. 1 is a diagram of a topology of a network.

FIG. 1 represents an illustrative bus comprising six nodes, referenced from A to F. Following a reinitialization of the bus, each node possesses only the item of information according to which it is linked to a single other node (the first node is then referred to as a 'leaf') or to more than one node ('branch'). Each node firstly determines, for each of its ports, whether they are connected to a parent node ('Parent port'), to a child node ('Child port') or whether they are not connected. The ports of each node are numbered in ascending order.

An illustrative process allowing this identification and the solving of any conflicts is described in section 3.7.3.1.2 and in appendix E, section 3.2 of the IEEE document.

Secondly, a unique physical address must be associated with each node connected to the bus. An autoidentification mechanism, an example of which is described in section 3.7.3.1.3 and in appendix E, section 3.3, is then implemented. This process allows each node to determine, for itself, its physical address, by accounting for data packets of a certain type (so-called 'Self_ID' packets) transmitted by the nodes over the bus. The autoidentification process can be summarized thus: the root node hands over to the node connected to its port having the smallest number and waits for this node, as well for all the 'child' nodes which are connected to it to be identified, before passing to the next port. When the root has reviewed all its ports, it is also identified. When a node takes over, it hands over in succession to its child nodes, in the order of its ports. When a node does not possess any children, it is identified by transmitting an appropriate packet over the bus.

For a node, identification consists in transmitting a data packet containing the physical address of the node, when it is its turn and when all its child nodes have been identified. The address of a node is equal to the last address transmitted in a packet over the bus, incremented by one unit. The first node conventionally has the address '0'.

The autoidentification packet also contains the category of each of the ports of the node which is identified. A packet may contain an item of information relating to four ports. If a node possesses more than four ports, then it must send several autoidentification packets.

In FIG. 1, the physical addresses determined by virtue of the autoidentification process have been labelled alongside the references A to F. The digits inside each frame representing a node indicate the port numbers.

Following the implementing of the two processes mentioned above, the following information is available:

TABLE 1

| Node | Parent Ports | Child Ports | Ports not linked |
|------|--------------|-------------|------------------|
| 0    | 2            | —           | 0, 1             |
| 1    | 0            | —           | 1                |
| 2    | 0            | —           | —                |
| 3    | 1            | 0, 2        | —                |
| 4    | 1            | —           | 0                |
| 5    | —            | 0, 1, 3     | 2                |

This table lists the nodes 0, 1, 2, 3, 4 and 5 of the network 20 of FIG. 1. In this table, the nodes are identified by their physical addresses. The information contained in table 1 is contained in the autoidentification packets.

It is possible, for any entity connected to the network, to construct the topology of the network from the information contained in Table 1. With respect to the contents of this table, the missing information item which fully determines the topology is that which indicates which node is connected to the 'child' ports of the 'parent' nodes.

According to the present embodiment, this item of information is determined by virtue of the following topology determination process:

1. Partitioning of the nodes into two sets, the first termed the "set of parents" comprising the nodes which have at least one child and the other termed the "set of children" comprising the nodes which have no child.

2. The node having the smallest physical address in the "set of parents" is taken into consideration.

3. The nodes of the "set of children" having a physical address smaller than that of the node taken into consideration in point 2 are taken into consideration. Among them, only the N nodes having the largest addresses are taken into consideration, N being the number of 'child' ports of the node of point 2. The 'child' ports of the node of point 2 are associated in the order of their ascending numbers with the child nodes determined in the previous sentence, likewise taken in the order of their ascending physical addresses.

4. Elimination of the "set of parents" of the node taken into account in point 2, and transfer to the "set of children". Elimination of the child nodes of this node from the "set of children".

5. As long as the "set of parents" is not empty, repeat the steps in order starting from point 2.

Figure 2:
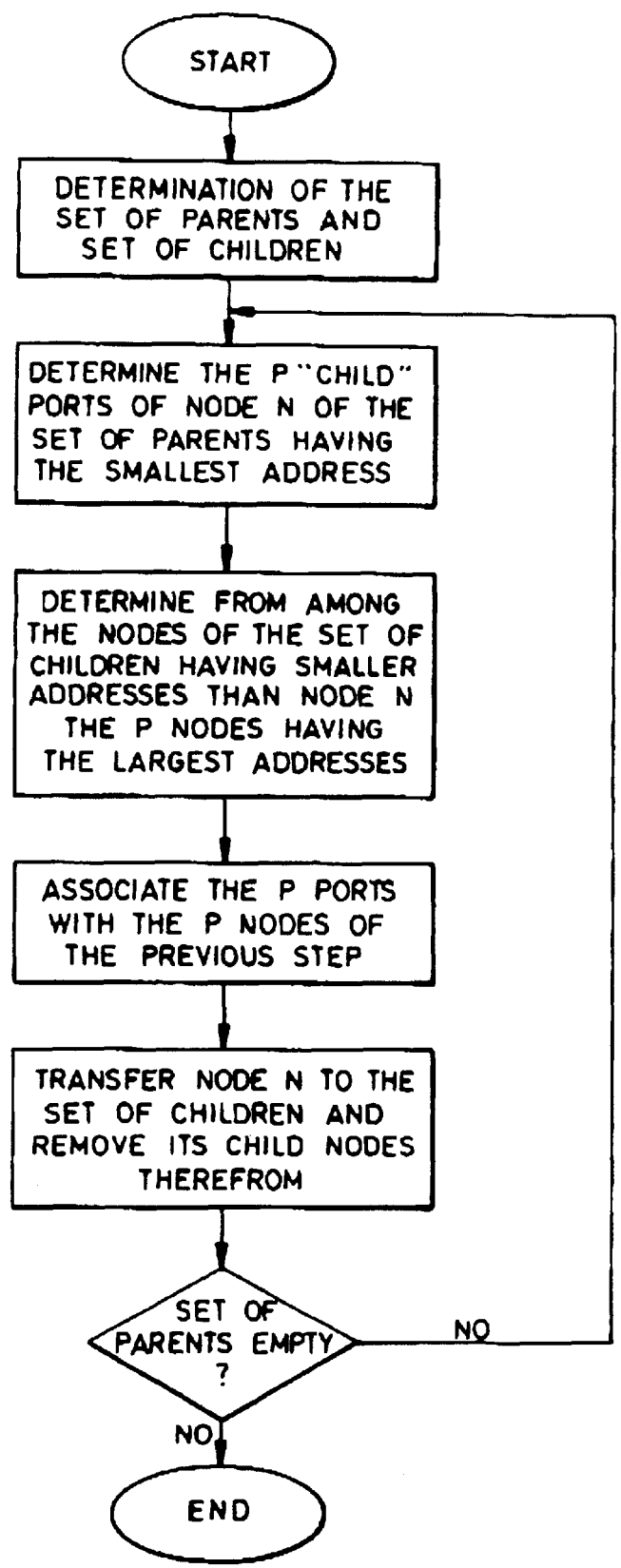
FIG. 2 is a flowchart of a process for determining topology.

This process is illustrated by the flowchart of FIG. 2 and is based on the process for allocating the physical addresses. Indeed, according to this process, the physical address allocated to a node is necessarily larger than that of the 'child' nodes which are attached thereto, these 'child' nodes sending their autoidentification packets before the 'father' node to which they are connected. Only the number of nodes corresponding to the number of ports to be associated is taken into account since there may be nodes with a smaller address which are not directly connected to the 'father' node, but to one of the 'child' nodes. Moreover, the order in which the ports of the 'father' node are considered during autoidentification is repeated when associating a port with a child node.

Table 2 indicates for the network of FIG. 1 the iterations of the process for determining the topology:

TABLE 2

| Description | Set of parents | Set of children | Results |
|-------------|----------------|-----------------|---------|
| Start | 3, 5 | 0, 1, 2, 4 | |
| The parent with the smallest address is 3. 3 has two children. The two largest children with an address less than 3 are 2 and 1. | 5 | 0, 3, 4 | Node 1 is connected to port 0 of node 3. Node 2 is connected to port 2 of node 3. |

TABLE 2-continued

| Description | Set of parents | Set of children | Results |
|---|---|---|---|
| The parent with the smallest address is 5. 5 has three children. The three largest children with an address less than 5 are 4, 3 and 0. The "set of parents" is empty; the connection tree is established. | — | — | Node 0 is connected to port 0 of node 5. Node 3 is connected to port 1 of node 5. Node 4 is connected to port 3 of node 5. |

Following a reinitialization of the bus, the three processes mentioned above are implemented. The topology of the bus, as defined in the two tables above and represented by FIG. 1, is therefore available.

According to the invention, the table of correspondence of the physical addresses of the nodes before and after initialization is established.

The information known at this instant by the node implementing the process is as follows:
the topology before and after reinitialization,
the old and the new physical address of the node which will implement the process described below.

It should be observed that the shifting of a node gives rise to two reinitializations, one related to the disconnection of the node, the other to the connection for example to another location. It should also be observed that the connected or disconnected node may itself already be connected to other nodes belonging for example initially to another network. We then speak of connection or disconnection of a branch.

For each port, the following cases may arise:
a node with address X was connected to the port before reinitialization, a node with address Y is connected after reinitialization: the new address of the node X is Y;
the node with address X attached to the port before reinitialization has disappeared from the network, as have all the 'child' nodes of the node X;
the node with address Y has been attached to the port since reinitialization. 'Child' nodes are, as appropriate, connected to the node Y.

Figure 3:
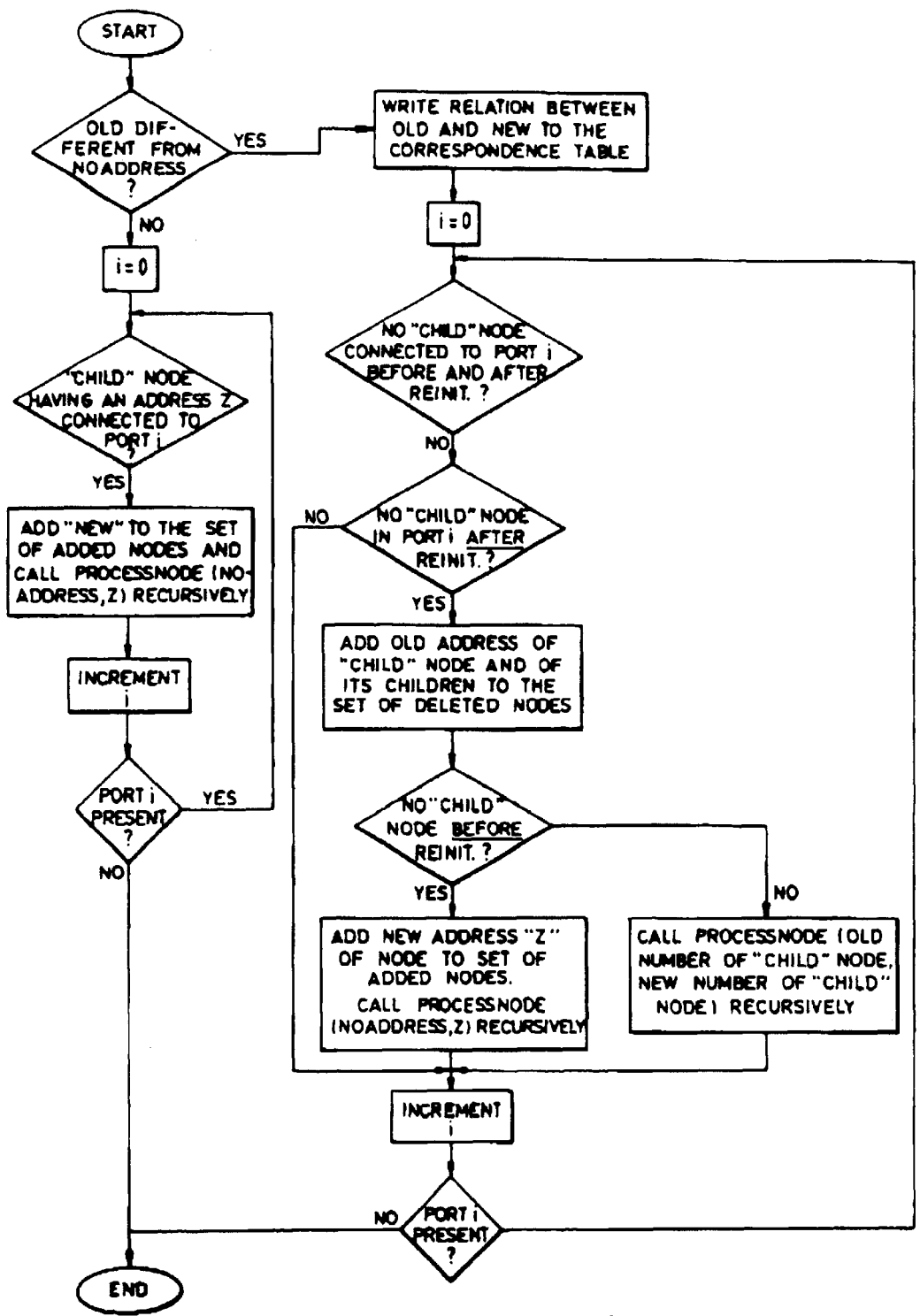
FIG. 3 is a flowchart of a process for creating a table of correspondence between the addresses of apparatus before and after a reinitialization.

The process for establishing the correspondence table checks each of these cases for each port of each node. This process is illustrated by the flowchart of FIG. 3. It comprises a procedure, termed 'ProcessNode', which must be supplied with two parameters: 'Old' and 'New', which are respectively the old and new addresses of the node implementing the process. When either one respectively of these variables has the value NOADDRESS, this indicates, if 'Old' possesses this value that the node taken into consideration did not exist in the old topology, and if 'New' possesses this value that the node no longer exists in the new topology.

The procedure is called a first time by a node, the root according to the present illustrative embodiment. The procedure is recursive and calls itself until the desired table of correspondences is determined.

Moreover, two sets of nodes are considered, namely the set of added nodes, and the set of deleted nodes which will contain respectively the old addresses of the nodes disconnected with respect to the old topology and the new addresses of the newly detected nodes. Stated otherwise, these sets contain all the nodes having no corresponding counterpart in the 'past' or the 'future', with respect to the reinitialization.

The process of establishing the correspondence table is as follows:
 1. If "Old" is different from NOADDRESS, go to step 6.
 2. Take the first port of the node identified by the 'New' parameter.
 3. If a 'child' node (with an address Z) is connected to this port, add the 'New' address to the set of added nodes and call ProcessNode (NOADDRESS, Z).
 4. Repeat step 3 for all the ports of the node.
 5. Go to step 13.
 6. Put the relation between "Old" and "New" in the correspondence table.
 7. Take the first port of the node considered.
 8. If no 'child' node is connected to this port, neither in the old topology nor in the new topology, go to step 12.
 9. If no 'child' node is connected to this port in the new topology, but a node was connected thereto in the old topology, add the old number of the 'child' node together with its children to the "eliminated node" set and go to step 12.
 10. If no 'child' node was connected to this port in the old topology, add the new number (Z) of the child node to the set of added nodes and call ProcessNode (NOADDRESS, Z).
 11. Otherwise (that is to say if a child node was and still is connected to the port), call ProcessNode (old number of the child node, new number of the child node).
 12. Process the other ports of the node (from step 8).
 13. End of processing.

Steps 1 to 5 correspond to the processing of a node which has newly appeared in the network (the old address has the value NOADDRESS). Steps 6 to 13 correspond to the processing of a node possessing an old and a new address. The ProcessNode procedure is never called when a node has disappeared from the network: this is a particular case processed at step 9 level.

A change of topology of the network of FIG. 1 will be taken by way of example to illustrate the above process. For the example to be complete, two changes (one connection and one disconnection of nodes) will be introduced here artificially, although in practice this would give rise to two separate reinitializations. The two modifications are chosen in such a way as to avoid the particular cases in which the process would fail.

Represented in FIG. 1 is the network before reinitialization. Ports with numbers 0, 1, 3 of the root node A are linked to ports 2, 1, 1 of the respective nodes B, C, D. B and D have no children, whereas ports 0, 2 of C are linked respectively to the respective ports 0, 0 of nodes E, F.

Node A is chosen as root node as regards the allocating of addresses.

Node F is deleted and node G is introduced, linked by its port number 0 to port number 0 of node D.

Figure 4:
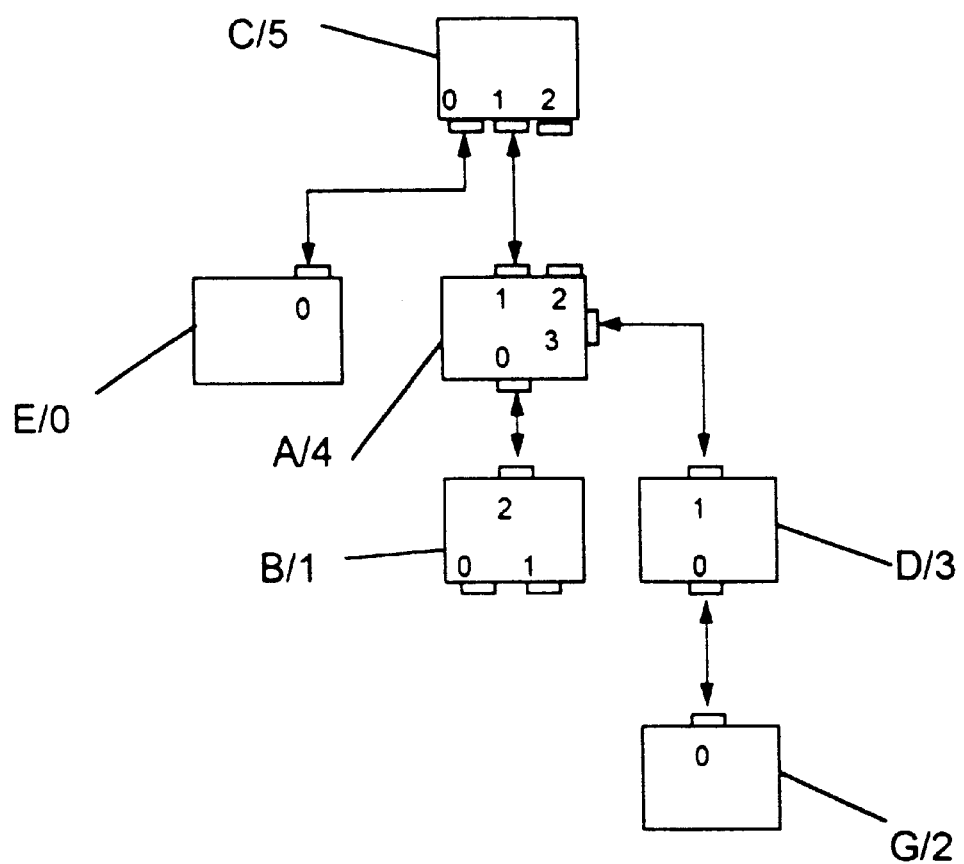
FIG. 4 is a diagram of a topology of the network of FIG. 1, after modification and reinitialization.

Represented in FIG. 4 is the network after reinitialization. Ports 0, 1 of node C are linked respectively to ports 0, 1 of respective nodes E and A. E has no children whereas A has two children B and D. Ports 0, 3 of A are linked to ports 2, 1 of nodes B, D. B has no children whereas port 0 of D is linked to port 0 of node G.

Node C is chosen as root node as regards the allocating of addresses.

Within the framework of the example, it is assumed that the process for establishing the table of correspondences is implemented by node A. It is implemented by each apparatus of the network desiring to establish the correspondence table, given that the presence within the network of nodes which do not use the process does not disturb the running of the latter.

Table 3 below is a table translating the implementation of the process for establishing the table of correspondence for the numbers of the nodes giving the state of the nodes after reinitialization, their old and new addresses as well as the old addresses of the nodes eliminated from the network and the new addresses of the nodes added. The level of recursivity corresponds to the number of calls of the ProcessNode procedure by itself.

Node A knows that it was the node with address 5 before reinitialization and that it has become node 4 thereafter, starts the process by calling the ProcessNode procedure (5, 4):

TABLE 3

| Node processed, Level of recursivity, Step of the process | Comments | Correspondence table | Node added | Node eliminated |
| --- | --- | --- | --- | --- |
| A, 0 | Call ProcessNode(5, 4) | | | |
| A, 1, 1 | True, then go to step 6 | | | |
| A, 1, 6 | We know that node 5 has become node 4 | 5->4 | | |
| A, 1, 7 | The first port of node A bears the number 0 | 5->4 | | |
| A, 1, 8 | Test false | 5->4 | | |
| A, 1, 9 | Test false | 5->4 | | |
| A, 1, 10 | Test false | 5->4 | | |
| A, 1, 11 | In port 0, the old address of the node was 0 and the new address is 1: call ProcessNode(0, 1) | 5->4 | | |
| B, 2, 1 | True, hence go to step 6 | 5->4 | | |
| B, 2, 6 | We know that node 0 has become node 1 | 5->4, 0->1 | | |
| B, 2, 7 | The first port of B is 0 | 5->4, 0->1 | | |
| B, 2, 8 | True, hence go to step 12 | 5->4, 0->1 | | |
| B, 2, 12 | True, the next port of B is port 1, go to step 8 | 5->4, 0->1 | | |
| B, 2, 8 | True, hence go to step 12 | 5->4, 0->1 | | |
| B, 2, 12 | True, the next port is port 2, go to step 8 | 5->4, 0->1 | | |
| B, 2, 8 | True, go to step 12 | 5->4, 0->1 | | |
| B, 2, 12 | False | 5->4, 0->1 | | |
| B, 2, 13 | All the 'child' nodes of node B have been processed, return to A, 1, 12 | 5->4, 0->1 | | |
| A, 1, 12 | True, the second port of node A bears the number 1, go to point 8 | 5->4, 0->1 | | |
| A, 1, 8 | False | 5->4, 0->1 | | |
| A, 1, 9 | False | 5->4, 0->1 | | |
| A, 1, 10 | False | 5->4, 0->1 | | |
| A, 1, 11 | In port 1, the old address of the node was 3 and the new address is 5: call ProcessNode(3, 5) | 5->4, 0->1 | | |
| C, 2, 1 | True, go to step 6 | 5->4, 0->1 | | |
| C, 2, 6 | We know that node 3 has become node 5 | 5->4, 0->1, 3->5 | | |
| C, 2, 7 | The first port of C is 0 | 5->4, 0->1, 3->5 | | |
| C, 2, 8 | False | 5->4, 0->1, 3->5 | | |
| C, 2, 9 | False | 5->4, 0->1, 3->5 | | |
| C, 2, 10 | False | 5->4, 0->1, 3->5 | | |
| C, 2, 11 | In port 0, the old address of the node was 1 and the new address is 0: call ProcessNode(1, 0) | 5->4, 0->1, 3->5 | | |
| E, 3, 1 | True, go to step 6 | 5->4, 0->1, 3->5 | | |
| E, 3, 6 | We know that node 1 has become node 0 | 5->4, 0->1, 3->5, 1->0 | | |
| E, 3, 7 | The first port of node E is 0 | 5->4, 0->1, 3->5, 1->0 | | |
| E, 3, 8 | True, go to step 12 | 5->4, 0->1, 3->5, 1->0 | | |
| E, 3, 12 | True, the second port of E is 1, go to step 8 | 5->4, 0->1, 3->5, 1->0 | | |
| E, 3, 8 | True, go to step 12 | 5->4, 0->1, 3->5, 1->0 | | |
| E, 3, 12 | False | 5->4, 0->1, 3->5, 1->0 | | |
| E, 3, 13 | All the child nodes of node E are processed, return to point C, 2, 12 | 5->4, 0->1, 3->5, 1->0 | | |
| C, 2, 12 | True, the second port of C is 1, go to step 8 | 5->4, 0->1, 3->5, 1->0 | | |
| C, 2, 8 | True, go to step 12 | 5->4, 0->1, 3->5, 1->0 | | |

TABLE 3-continued

| Node processed, Level of recursivity, Step of the process | Comments | Correspondence table | Node added | Node eliminated |
|---|---|---|---|---|
| C, 2, 12 | True, process port 2 and go to step 8 | 5->4, 0->1, 3->5, 1->0 | | |
| C, 2, 8 | False | 5->4, 0->1, 3->5, 1->0 | | |
| C, 2, 9 | True, there was a node with address 2 in port 2 of node C before reinitialization, there is no longer one in this port after reinitialization, hence this node as well as its child nodes are eliminated | 5->4, 0->1, 3->5, 1->0 | | 2 |
| C, 2, 12 | False | 5->4, 0->1, 3->5, 1->0 | | 2 |
| C, 2, 13 | All the children of node C are processed, return to step A, 1, 12 | 5->4, 0->1, 3->5, 1->0 | | 2 |
| A, 1, 12 | True, the third port of C is 2, go to step 8 | 5->4, 0->1, 3->5, 1->0 | | 2 |
| A, 1, 8 | True, go to step 12 | 5->4, 0->1, 3->5, 1->0 | | 2 |
| A, 1, 12 | True, the fourth port of C is 3, go to step 8 | 5->4, 0->1, 3->5, 1->0 | | 2 |
| A, 1, 8 | False | 5->4, 0->1, 3->5, 1->0 | | 2 |
| A, 1, 9 | False | 5->4, 0->1, 3->5, 1->0 | | 2 |
| A, 1, 10 | False | 5->4, 0->1, 3->5, 1->0 | | 2 |
| A, 1, 11 | In port 3, the old address of node D was 4 and the new address is 3: call ProcessNode(4, 3) | 5->4, 0->1, 3->5, | | 2 |
| D, 2, 1 | True, go to step 6 | 5->4, 0->1, 3->5, 1->0, | | 2 |
| D, 2, 6 | We know that the node with address 4 has become the node with address 3 | 5->4, 0->1, 3->5, 1->0, 4->3 | | 2 |
| D, 2, 7 | The first port is 0 | 5->4, 0->1, 3->5, 1->0, 4->3 | | 2 |
| D, 2, 8 | False | 5->4, 0->1, 3->5, 1->0, 4->3 | | 2 |
| D, 2, 9 | False | 5->4, 0->1, 3->5, 1->0, 4->3 | | 2 |
| D, 2, 10 | True, we have detected that this node G is new, we must therefore process all the children of G so as to incorporate them into the set of added nodes: call ProcessNode(NOADDRESS, 2) | 5->4, 0->1, 3->5, 1->0, 4->3 | 2 | 2 |
| G, 3, 1 | False | 5->4, 0->1, 3->5, 1->0, 4->3 | 2 | 2 |
| G, 3, 2 | The first port of G is 0 | 5->4, 0->1, 3->5, 1->0, 4->3 | 2 | 2 |
| G, 3, 3 | False | 5->4, 0->1, 3->5, 1->0, 4->3 | 2 | 2 |
| G, 3, 4 | False | 5->4, 0->1, 3->5, 1->0, 4->3 | 2 | 2 |
| G, 3, 5 | Go to step 13 | 5->4, 0->1, 3->5, 1->0, 4->3 | 2 | 2 |
| G, 3, 13 | All the child nodes of node G are processed, return to step D, 2, 11 | 5->4, 0->1, 3->5, 1->0, 4->3 | 2 | 2 |
| D, 2, 11 | False | 5->4, 0->1, 3->5, 1->0, 4->3 | 2 | 2 |
| D, 2, 12 | True, the second port of D is 1, go to step 8 | 5->4, 0->1, 3->5, 1->0, 4->3 | 2 | 2 |
| D, 2, 8 | True, go to step 12 | 5->4, 0->1, 3->5, 1->0, 4->3 | 2 | 2 |
| D, 2, 12 | False | 5->4, 0->1, 3->5, 1->0, 4->3 | 2 | 2 |
| D, 2, 13 | All the child nodes of node D are processed, return to A, 1, 12 | 5->4, 0->1, 3->5, 1->0, 4->3 | 2 | 2 |
| A, 1, 12 | False | 5->4, 0->1, 3->5, 1->0, 4->3 | 2 | 2 |
| A, 1, 13 | All the child nodes of node A are processed, the process has therefore terminated | 5->4, 0->1, 3->5, 1->0, 4->3 | 2 | 2 |

Thus, after implementing the above process, the results of which are made explicit in Table 3, we know that:

node F numbered 2 before reinitialization has been eliminated, node G numbered 2 after reinitialization has been added, a correspondence table indicating for each node other than F and G their number before and after reinitialization: for example, apparatus C was node 3 before reinitialization and has become node 5 thereafter.

Figure 5:
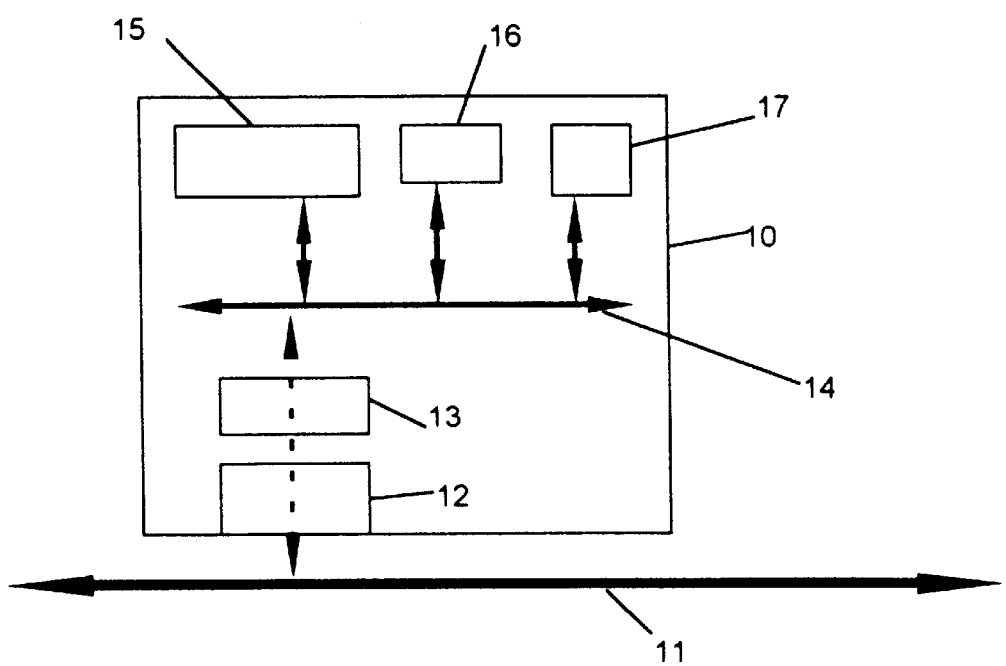
FIG. 5 is a block diagram of a node able to be connected to the network.

FIG. 5 is a block diagram of a node 10 comprising a single port. This node is for example a 'DVD' type optical disk reader. Node 10 is connected to the serial 1394 bus bearing the reference 11 across a physical interface 12 and a linking circuit 13. The latter is linked to the internal parallel bus 14 of the node 10. A microprocessor 15 or equivalent device ensures the management of the node, which also comprises a circuit for managing the inputs/outputs 16, as well as a memory 17. These last three elements are also linked to the parallel bus 14.

Typically, the microprocessor takes on board the implementation of the autoidentification process, as well as of the processes for determining the topology of the network and for establishing the table of correspondences. The information regarding the topology before and after reinitialization, which is obtained according to the present example from the autoidentification packets, as well as the correspondence table are stored for example in the memory 17.

What is claimed is:

1. A method for determining node address correspondence in a communication network in which each node is allocated a unique address after each network reset, wherein the address of a given node before a reset may differ from the address after said reset, said method comprising the process steps, at the level of a node connected to said network, of:

determining a first network topology based on self-identification packets received before said reset;

determining a second network topology based on self-identification packets received after said reset; and deriving a correspondence between said address of said node before said reset and said address of said node after said reset by comparing said first and second network topologies.

2. A method according to claim 1, wherein said comparison of said first and second network topologies includes the steps of:

determining the set of nodes which were present in said network before said reset and which are not present in said network after said reset; and determining the set of nodes which are present in said network after said reset but not present in said network before said reset.

3. A method according to claim 1, wherein each said node comprises at least one port for connection to said network, and said step of deriving a correspondence comprises, for each said port of each said node, the steps of determining at least one of the states of:

the presence of a node connected to the port both before and after reset, the presence of a node connected to the port before reset and the absence of a node connected to the port after reset, and the presence of a node connected to the port after reset and absence of a node connected to the port before reset.

4. A method according to claim 1, wherein a node determines addresses by receiving from each node of the network information, which information comprises the address of the node in the network, and for each port of each node, an indication of the connection of the port to a parent node, the connection of the port to a child node, or the lack of a connection to the port.

5. A method according to claim 1, wherein a network reset is triggered by removal of a node from the network or connection of a node to the network.

6. A device for linking with a communication network, said device comprising:

means for participating in obtaining a non-persistent unique node address of the device in said network following a reset;

means for determining the topologies of the network before and after reset of said network based on self-identification packet information; and means for establishing, on the basis of said topologies, a correspondence between said unique node address of each node before said reset and said unique node address of said node after said reset.

7. A process for identifying added or removed nodes in a communication network in which each node is allocated a non-persistent address after each network reset, said process comprising the steps, at the level of a node connected to the network, of:

storing first self-identification information before a network reset for use after the network reset;

storing second self-identification information after a network reset;

deriving first and second node connection trees respectively from the first and second self-identification information; and comparing the node connection trees to identify a node added to or removed from the network.

8. A process according to claim 7, wherein a network reset is triggered by removal of a node from the network or connection of a node to the network.

* * * * *